No. 793,010. PATENTED JUNE 20, 1905.
H. C. MILLER.
MACHINE FOR LOCATING AND STITCHING BUTTONHOLES IN COLLARS.
APPLICATION FILED FEB. 8, 1904.
4 SHEETS—SHEET 1.
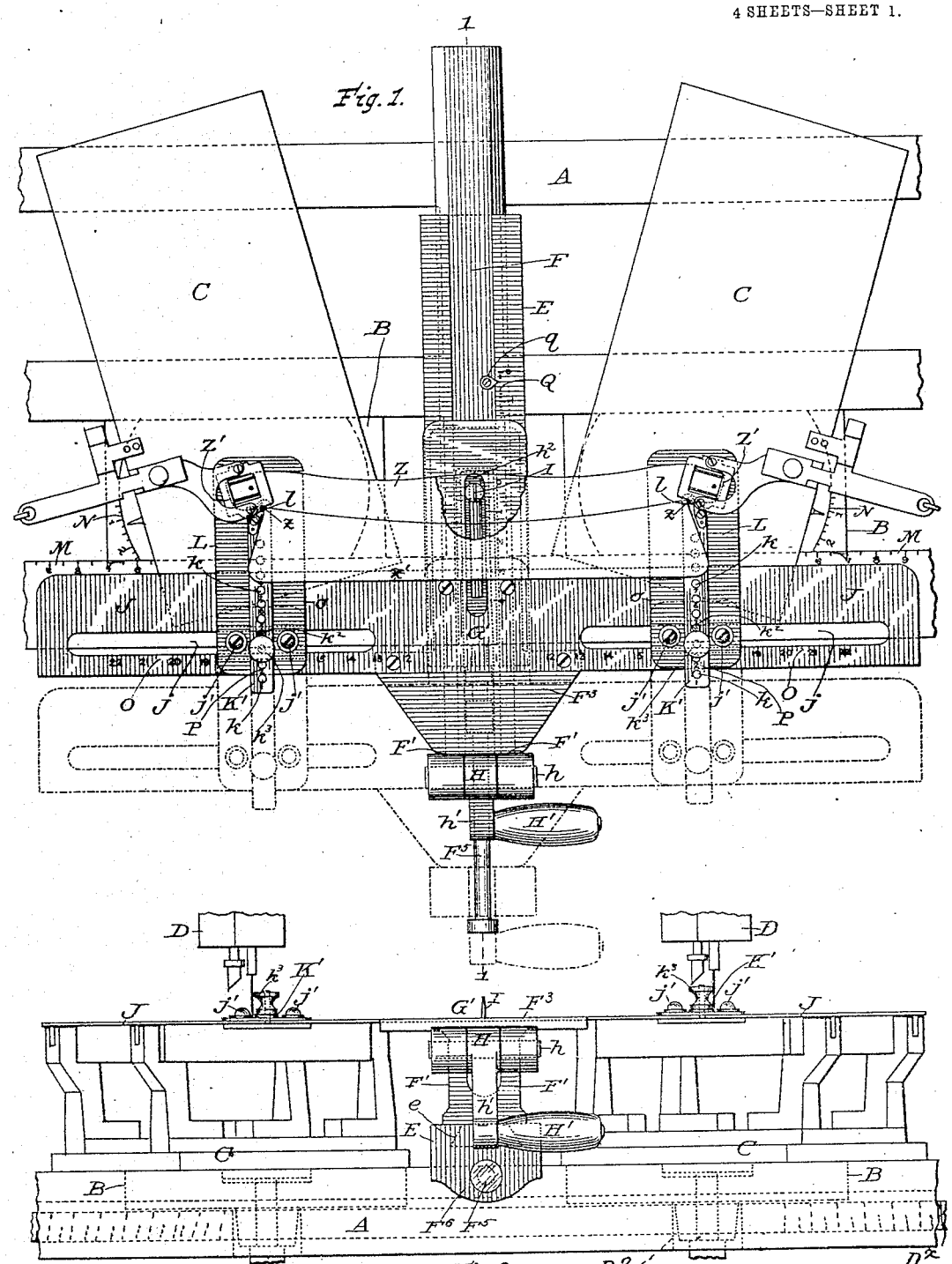

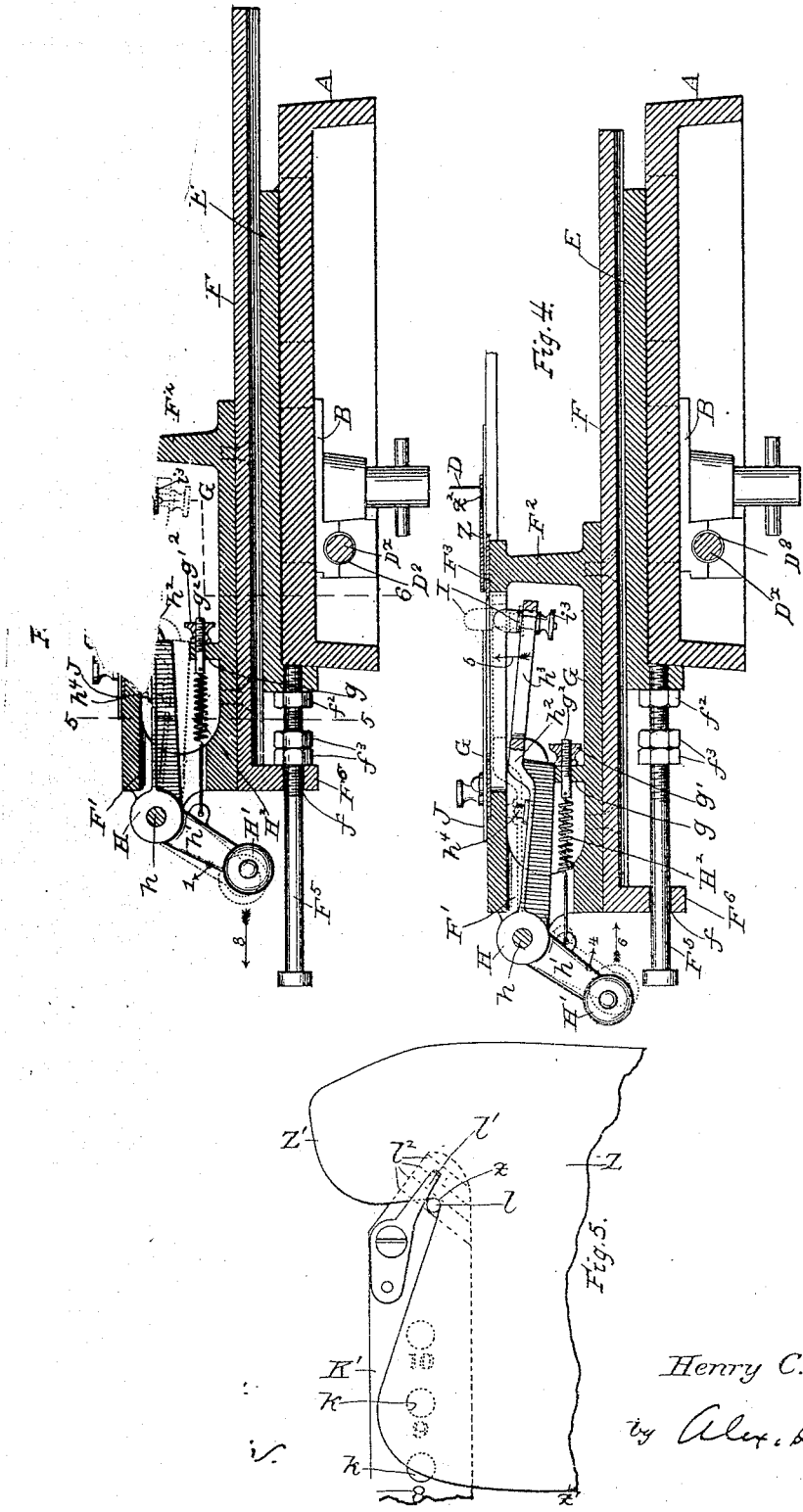

No. 793,010. PATENTED JUNE 20, 1905.
H. C. MILLER.
MACHINE FOR LOCATING AND STITCHING BUTTONHOLES IN COLLARS.
APPLICATION FILED FEB. 8, 1904.
4 SHEETS—SHEET 3.
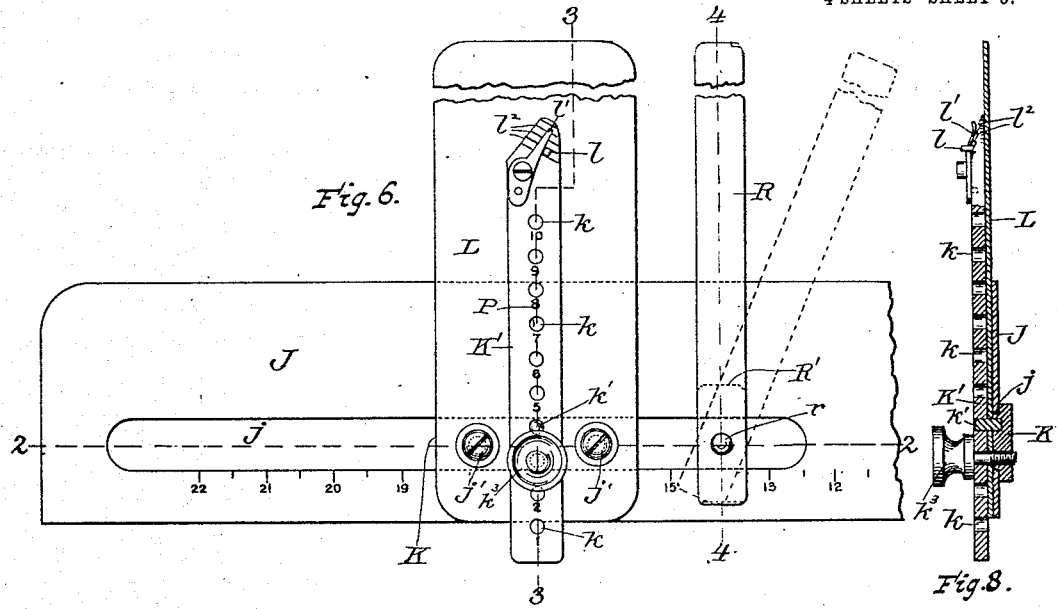
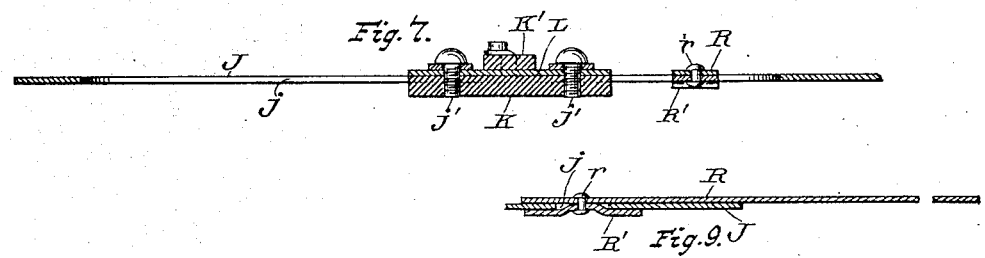
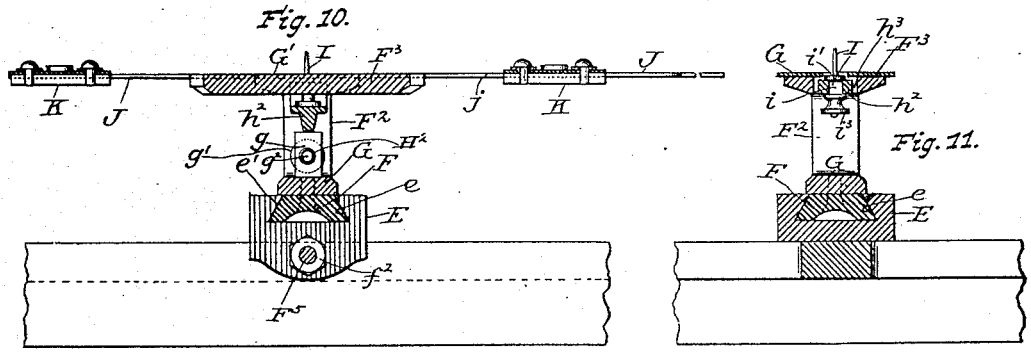
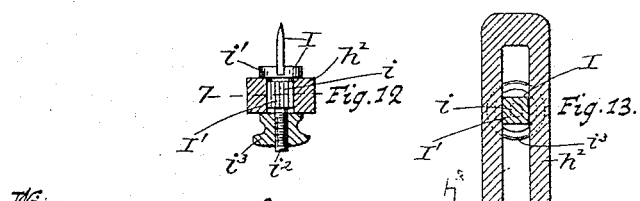
Witnesses.
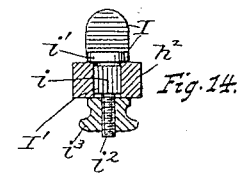
Henry C. Miller,
Inventor,
by Alex. Selkirk
Attorney.

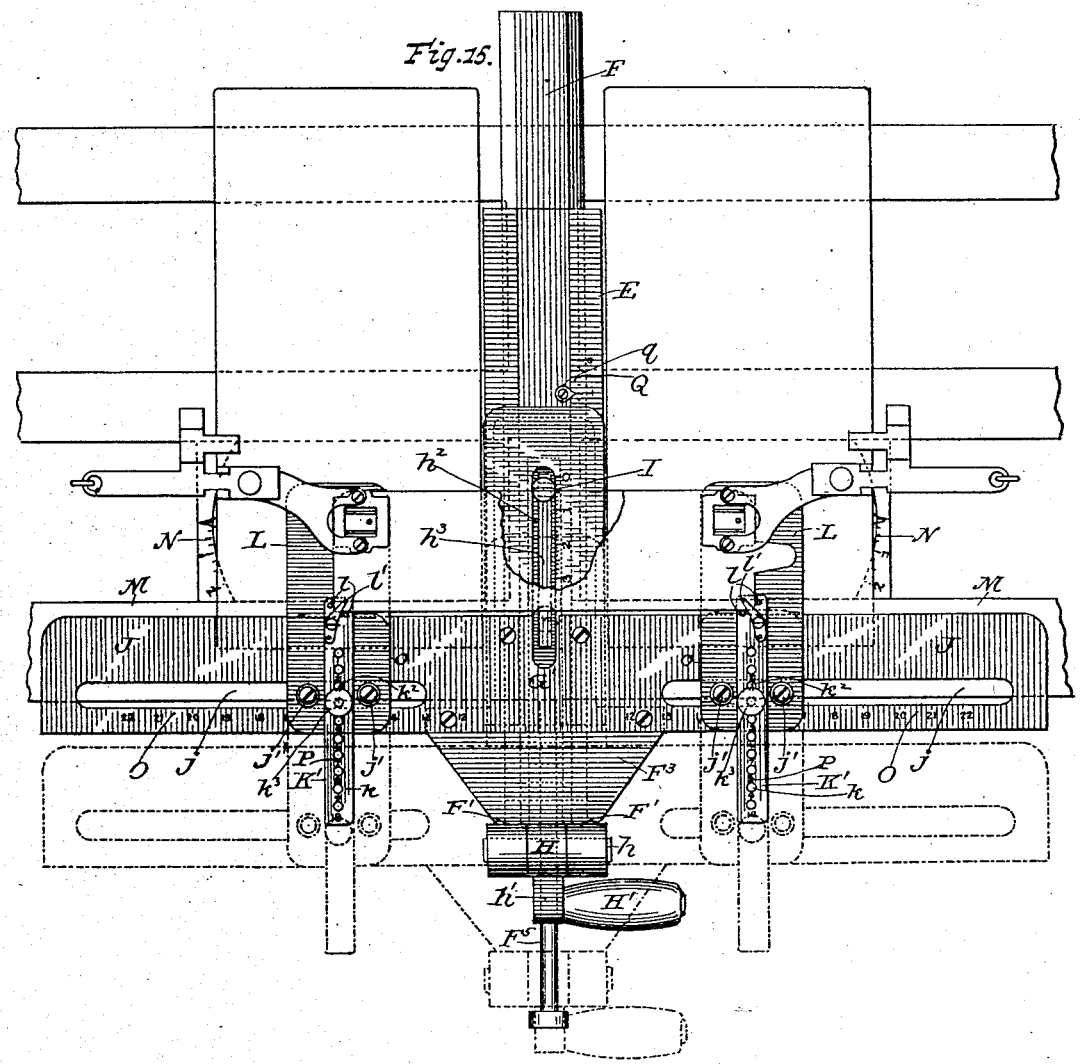
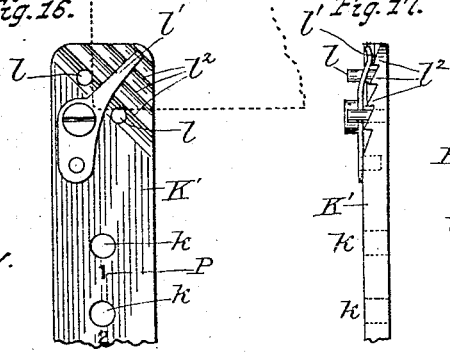

No. 793,010.

Patented June 20, 1905.

UNITED STATES PATENT OFFICE.

HENRY C. MILLER, OF WATERFORD, NEW YORK.

MACHINE FOR LOCATING AND STITCHING BUTTONHOLES IN COLLARS.

SPECIFICATION forming part of Letters Patent No. 793,010, dated June 20, 1905.

Application filed February 8, 1904. Serial No. 192,513.

*To all whom it may concern:*

Be it known that I, HENRY C. MILLER, a citizen of the United States, residing at Waterford, in the county of Saratoga and State of New York, have invented new and useful Improvements in Machines for Locating and Stitching Buttonholes in Collars, Cuffs, &c., of which the following is a specification.

This invention relates to a machine for locating buttonholes in collars, cuffs, &c.

The object of the invention is to provide mechanism for adjusting a pair of buttonhole-sewing machines to operate upon collars of different sizes and styles, in combination with a centralizing mechanism consisting of a movable platform which receives the collar and delivers the same to the sewing-machine to accurately locate the end buttonholes an equidistance from a determinate point in the collar.

The invention also comprehends improvements in the centralizing mechanism which consists of a platform on which the collars are placed to be gaged, the collars then being moved to the sewing-machines. The platform carries adjustable devices with adjacent appropriate scales for assisting the operator in adjusting the machine for collars of different sizes and styles. In order that time may be saved, the various parts are arranged with a view of permitting the centralizing mechanism being withdrawn from the sewing-machines while the latter operate upon the collar previously delivered thereto to enable the operator to centralize another collar and have it ready for the successive operation of said sewing-machines.

Other objects and advantages will be hereinafter referred to and be particularly pointed out in the claims.

In the drawings, Figure 1 is a plan view of the machine. Fig. 2 is a front view of the same. Fig. 3 is a section taken at line 1 in Fig. 1, showing the collar in place beneath the needle. Fig. 4 is a section taken at same line in Fig. 1, showing the first collar in place under the needle and the mechanism for centralizing collars drawn toward the operator for placement of a second collar. Fig. 5 is an enlarged plan view of one of the temporary collar-holders. Fig. 6 is a plan view of the same mounted on the platform. Fig. 7 is a section on the line 2 2, Fig. 6. Fig. 8 is a section on the line 3 3, Fig. 6. Fig. 9 is a section on line 4 4, Fig. 6. Fig. 10 is a section on the line 5 5, Fig. 3. Fig. 11 is a section on the line 6 6, Fig. 3. Fig. 12 is a detail enlarged view of a part shown in Fig. 11. Fig. 13 is a section on the line 7 7 of Fig. 12. Fig. 14 is a view similar to Fig. 12 with the buttonhole-engaging device turned transversely. Fig. 15 is a plan view of a different form of my invention for use in connection with collars or cuffs without end tabs. Fig. 16 is a detail plan view of a temporary holder for use with a collar or cuff without end tabs. Fig. 17 is an edge view of the same.

In the drawings, A represents the bed of the machine formed with ways to accommodate block B B, carrying swiveling plates C C, and on each plate is mounted a buttonhole-sewing machine D. A rod $D^x$, having right and left hand screw-threads, passes through the nuts $D^2$ on the blocks to simultaneously adjust the buttonhole-machines toward or from each other. Scales M M are formed adjacent the blocks B B, and on the latter are circular scales N N.

The above-mentioned parts specifically form no part of my present invention, being described and claimed in a pending application, Serial No. 103,742, filed April 19, 1902.

A bar E is fastened to the bed approximately midway between the sewing-machines, and formed in the upper side of said bar is a dovetailed groove $e$, in which fits a rib formed on the base-plate F of a carriage G. The base-plate F is provided with standards $F'$ $F^2$, supporting a platform $F^3$, which carries my improved centralizing mechanism. A scale Q is located adjacent the dovetail groove, and a pointer $q$ on the base-plate F registers with the scale to determine the adjustment of the carriage with reference to the sewing-machines and the style of collar. The carriage is limited in its movement by a headed rod $F^5$, which is threaded in a lug on the bar E and held in locked position by a set-nut $f^2$. The rod passes freely through an opening $f$, formed in a lug $F^6$ on base F, and nuts $f^3$, engaging the threads of the rod, serve as a stop. The carriage is limited in its outward movement by the head of the rod and in its inward movement by the nuts $f^3$, the latter being previously adjusted.

A lever H is pivotally connected to the standards F' by a pin $h$, the arm $l$ of the lever being at an angle to the rear arm $h^2$ and is provided with a handle H'. The arm $h^2$ is formed with a slot $h^3$, in which is adjustably mounted a centralizing engaging device I. A spring $H^2$ is connected at one end to the arm $h'$ and at its opposite end to a threaded screw $g^2$, passing through a lug $g$ and adjusted by a nut $g'$. The tension of the spring tends to throw the arm $h^3$ up toward the platform $F^3$, its upward movement being limited by a stop $h^4$.

The centralizing engaging device I is adjustable in the slot formed in arm $h^2$, and it consists of a holder I, having a square body portion $i$, flanged at its upper end $i'$, and a screw-threaded stem $i^2$, which is engaged by a binding-nut $i^3$. The adjustment of the device I is essential to adapt the machine for various sizes and styles of collars, and to operate upon collars having the central buttonholes transverse of their length the blade will be turned accordingly, as shown in Fig. 12.

A transverse plate J is carried by the platform $F^3$, and it is provided each side the platform with a slot $j$, and adjacent each slot is a scale O. A block K, having flanges which engage the under side of plate J, fits in each slot $j$, and on the top of plate J is a collar-supporting plate L, carrying a gage-bar K', and a set-screw $k^3$ binds the gage-bar, collar-supporting plate L, and plate J together. A pin $k'$ also engages the parts to prevent lateral displacement after they have been adjusted. The collar-supporting plate is further provided with set-screws $j''$ to engage the block K to assist in maintaining the parts in their relative location. The collar-supporting plates extend beyond the plate J, that their rear ends may be passed beneath the cloth-clamping plates of each machine and adapted to support the end portions of a collar in which a buttonhole is to be formed.

Each gage-bar K' is formed with a series of openings $k$, with an adjacent scale P, the set-screw $k^3$, and pin $k'$, engaging two of the openings when setting the gage-bar for a different shape or style of collar. The inner end of the bar K' is formed with a series of angular serrations $l^2$, gage-pin $l$, and a spring-finger $l'$, the latter being so located as to overhang and slightly contact with the serrations to temporarily hold the end of a collar or cuff.

Adjustably secured by a rivet $r$ and block R' in slots $j$ are supplemental holding devices R, designed to exert pressure on the plate J and a collar or other article on the same. The holding devices may be turned on their pivots to serve as supports for a portion of an article being operated upon in case the latter should be unusually wide or long.

In operation the various adjustments are made in accordance with a card-schedule having scales corresponding with the various scales on the machine for each style and length of collar when the machine is ready for forming buttonholes. The carriage is first withdrawn, as shown in dotted lines in Fig. 1, and the blade I is slipped through the center buttonhole, (or the collar is engaged by a point if no center buttonhole has been formed.) The tabs Z' of collar Z are then slipped under the temporary holding devices $l'$ until the corners $z$ engage the gage-pins $l$, as shown in Fig. 5. These pins are exactly the same distance each side a point in the collar where a buttonhole is to be formed. The collar having been accurately gaged, the operator grasps handle H' and forces the carriage toward the sewing-machines until lug $F^6$ strikes nut $f^3$, which properly presents the collar under the work-clamps, and as the collar-supports project beyond the path of the needle they draw sufficient thread for the next operation. The cloth-clamps are now released to hold the collar, and the operator rocks the handle in the direction of arrow 3, Fig. 3, which disengages the blade I from the buttonhole, and by a continued pull on said handle the carriage is withdrawn to reload it for the next operation, the sewing mechanisms being started in the meantime to form the buttonholes. When the carriage is withdrawn, the temporary holding devices readily release the ends of the collar, as will be obvious. By the time the buttonholes are finished the operator has had ample time to place another collar on the platform and the clamps are raised for the removal of the article operated upon.

When tabless collars or cuffs are to be operated upon, two gage-pins $l$ $l$ are employed, as shown in Fig. 16.

Having described my invention, what I claim, and desire to secure by Letters Patent, is—

1. In a machine for locating and stitching buttonholes in collars, the combination with a frame, of two buttonhole-stitching machines mounted on said frame at suitable distance apart, and provided with cloth-clamping plates, a movable carriage supported by said frame midway between the two stitching-machines, mechanism carried by said carriage, means for moving said carriage to or from the buttonhole-stitching machines to present a collar beneath the cloth-clamping plates, and mechanism for engaging the collar operated upon at a predetermined point while its end portions are being carried under the said cloth-clamping plates.

2. In a machine for locating and stitching buttonholes in collars, the combination with a frame, of two duplicate buttonhole-stitching machines provided with clamping-plates, and mechanism for centralizing a collar between said stitching-machines, said mechanism comprising means for engaging the collar at approximately the center thereof, means for simultaneously engaging the two end portions of the collar, and means for moving the centralizing mechanism toward the stitching-machines to present the ends of the collar under the clamping-plates.

3. In a machine for locating and stitching buttonholes in collars, the combination with a frame, of two duplicate buttonhole-stitching machines mounted on said frame spaced from each other and operating simultaneously for stitching a buttonhole in the ends of a collar, each machine having a cloth-clamping plate, mechanism for centralizing the collar between the two stitching-machines, the centralizing mechanism comprising a carriage mounted on the frame between the buttonhole-stitching machines, means supported on the carriage for holding the two end portions of a collar, means coacting with the holding means for gaging the two end portions of the collar, and mechanism for moving the centralizing mechanism toward the stitching-machines to present the ends of the collar beneath the cloth-clamping plates.

4. In a machine for locating and stitching buttonholes in collars, the combination with a frame, two duplicate stitching-machines mounted on said frame, spaced from each other, and provided with cloth-clamping plates, a carriage mounted on said frame midway between the cloth-clamping plates of the stitching-machines, means for moving the carriage to or from the stitching-machines, a transverse plate mounted on the carriage, two plates for supporting opposite ends of a collar, an adjustable collar-guiding device carried by each of said plates to present the ends of the collar beneath the cloth-clamping plates, and means for holding the said guided ends of the collar from shifting.

5. In a machine for locating and stitching buttonholes in the end portions of collars, the combination with a frame, of two buttonhole-stitching machines having cloth-clamping plates, a carriage supported on said frame, said carriage being relatively between the two stitching-machines and in part relatively forward of the same, means for moving the carriage to or from the stitching-machines, centralizing mechanism mounted on said carriage for supporting the middle and ends of a collar, said centralizing mechanism consisting of means for gaging the ends of the collar, means for holding the ends of the collar, mechanism for holding the middle portion of the collar against movement in relation to the supporting means, and means for releasing the collar-holding mechanism after the cloth-clamping plates clamp the collar, the collar-end-holding means releasing the collar as the carriage is moved away from the buttonhole-machines, by a forward movement of the carriage.

6. In a machine for locating and stitching buttonholes in collars, the combination with buttonhole-stitching machines, of a carriage, a lever pivoted on said carriage, an adjustable collar-retaining device on the lever, means for operating the lever, and means for holding the collar flat.

7. In combination, a pair of buttonhole stitching and cutting machines, a carriage, means for moving the carriage toward or from the buttonhole-stitching machines, a platform on the carriage, means for centrally engaging a collar supported on the platform, and means for operating the latter means simultaneously with the movement of the carriage to or from the buttonhole-stitching machines.

8. In combination, a pair of buttonhole cutting and stitching machines provided with cloth-clamping plates, mechanism for varying the distance between the two buttonhole-machines, a carriage intermediate the two buttonhole-machines, a platform on the carriage, said platform having end gaging and holding devices, a device for centrally engaging a collar, and means for operating said latter device when the carriage is moved to or from the pair of buttonhole-machines.

9. In combination, a pair of buttonhole cutting and stitching machines provided with cloth-clamping plates, means for varying the distance between the two buttonhole-machines, a carriage mounted intermediate the two buttonhole-machines, a centralizing collar-engaging device pivotally mounted on the carriage, two gages for engaging the ends of collars, and mechanism successively disengaging the centralizing device and withdrawing the carriage from the buttonhole-machines.

10. In combination, a pair of buttonhole cutting and stitching machines, a carriage, means for varying the distance between the buttonhole-machines, mechanism carried by the carriage for positioning a collar to receive buttonholes at predetermined points, and mechanism for moving the carriage to or from the buttonhole-machines.

11. In combination, a pair of buttonhole cutting and stitching machines provided with cloth-clamping plates, a carriage, mechanism for moving the carriage toward or from the buttonhole-machines, a platform on the carriage, gages and holding devices on the platform, mechanism independent of the gaging and holding devices for engaging a collar at a predetermined point, mechanism for moving the carriage toward the buttonhole-machines, mechanism for simultaneously operating the cloth-clamping plates, and means for withdrawing the carriage and releasing the holding and gaging devices from the collar.

12. In combination, a pair of pivotally-mounted buttonhole cutting and stitching machines, means for varying the distance between the two buttonhole-machines, a carriage intermediate the two buttonhole-machines, a platform on the carriage, means carried by the platform for holding and gaging a collar to be operated upon, and mechanism for moving the carriage toward or from the buttonhole-machines.

13. In combination, a pair of buttonhole-stitching machines provided with cloth-clamping plates, means for varying the distance between the pair of buttonhole-machines, a carriage intermediate the two buttonhole-machines, a platform on the carriage, gages, means for adjusting the gages to or from the carriage, and mechanism for moving the carriage toward or from the buttonhole-machines.

14. In combination, a pair of buttonhole-stitching machines, means for varying the distance between the two machines, a cloth-clamping plate carried by each buttonhole-machine, a carriage mounted intermediate the two buttonhole-machines, a platform on the carriage, gages on the platform, means for moving the gages to or from the carriage, means for adjusting the gages to or from the buttonhole-machines, and means for operating the carriage toward or from the buttonhole-machines.

15. In combination, a pair of buttonhole-stitching machines, means for varying the distance between the two buttonhole-machines, a carriage, a platform on the carriage, gaging devices mounted on the platform, means for adjusting the gaging devices to or from the carriage, means for adjusting the gaging devices to or from the buttonhole-machines, means for adjusting the platform, and mechanism for moving the platform toward or from the buttonhole-machines.

16. In combination, a pair of buttonhole-stitching machines, means for varying the distance between the two buttonhole-machines, a carriage, a platform mounted on the carriage, collar-gages mounted on the platform, means for adjusting the collar-gages to or from the carriage, means for adjusting the collar-gages to or from the buttonhole-machines, mechanism for centrally engaging a collar, and mechanism for disengaging the latter mechanism and moving the platform from the buttonhole-machines.

17. In combination, two buttonhole-stitching machines, a carriage, a platform mounted on the carriage, collar-gages carried by the platform, a collar-centralizing means, said centralizing means pivoted to the carriage and provided with a collar-engaging device, means for normally holding the engaging device in position to receive a collar, and means for disengaging the engaging device and withdrawing the carriage from the buttonhole-machines.

18. In combination, a pair of buttonhole-stitching machines, a carriage, a platform mounted on the carriage, collar-gaging devices carried by the platform, means for engaging the center of a collar, means for moving the carriage toward or from the buttonhole-machines, and adjustable means for limiting the carriage in its movement in one direction.

19. In combination, a pair of buttonhole-stitching machines, a carriage intermediate the two buttonhole-machines, means for limiting the movement of the carriage toward the buttonhole-machines, a platform supported by the carriage, collar-gaging devices supported on the platform, a pivoted centralizing device intermediate the gages, a handle on the centralizing device, means for normally holding the centralizing device in operative position, the disengaging of the centralizing device serving also as a means for withdrawing the carriage from the buttonhole-machines.

20. In combination, a pair of buttonhole-stitching machines, a carriage, means coöperating with the carriage to gage a collar, a pivoted lever on the carriage, one end of said lever carrying a centralizing device and its opposite end a handle, means for normally positioning the centralizing device, the handle serving as a means for disengaging the centralizing device and also withdrawing the carriage from the buttonhole-machines.

21. In combination, a pair of buttonhole-stitching machines, a slide intermediate the two buttonhole-stitching machines, a carriage adjustably mounted on the slide, a platform supported on the carriage, collar-gaging devices on the platform, means for adjusting the gages, a centralizing device, and means for operating the centralizing device and the carriage.

22. In combination, a pair of buttonhole-stitching machines, a slide intermediate the stitching-machines, a carriage mounted on the slide, a platform on the carriage, gaging devices adjustable in line with the movement of the carriage, a centralizing device, and means operating the centralizing device and platform.

23. In combination, a pair of buttonhole-stitching machines, a carriage intermediate the stitching-machines, a platform supported by the carriage, plates adjustably mounted on the platform and adjustably mounted to be moved to or from the carriage, gages adjustably mounted on the plates, a centralizing device, and means for moving the centralizing device, and platform to or from the buttonhole-machines.

24. In combination, a pair of buttonhole-stitching machines, a slide intermediate the stitching-machines, a carriage adjustably secured to the slide, a platform supported by the carriage, a pivoted lever, an adjustable centralizing device mounted on the lever, a platform supported by the carriage, adjustably-mounted gages on the platform, and means operating the centralizing device and the carriage.

25. In combination, a pair of pivotally-mounted buttonhole-stitching machines, means for varying the distance between the two machines, a scale indicating the angle the machines are turned on their pivots, an adjustably-mounted carriage, a scale indicating the movement of the carriage, a platform on the carriage, adjustably-mounted plates on the platform, scales indicating the movement of the plates, adjustably-mounted gages on the plates, scales indicating the movement of the gages, a centralizing device, a scale indicating the movement of the centralizing device, and means for moving the carriage to or from the buttonhole-machines.

26. In combination, a buttonhole-stitching machine, a carriage, a collar-gaging device on the carriage, means coacting with the gaging device to locate the collar, said means positively engaging the collar, and means for sliding the carriage to the buttonhole-stitching machine.

27. In combination, two buttonhole-stitching machines, a carriage, two end gages to engage an article to receive buttonholes, a centralizing device, an auxiliary device for supporting the article, and means for sliding the carriage toward the buttonhole-stitching machines.

28. In combination, a pair of buttonhole-stitching machines, a carriage movable intermediate the machines, a platform supported on the carriage, slots formed in the platform, plates on the platform and adjustably mounted in the slots, gages adjustably mounted on the plates, temporary retaining devices mounted on the gages, an adjustably-mounted centralizing device, and mechanism operating the centralizing device and serving as a means for operating the carriage.

29. In combination, a pair of buttonhole-stitching machines, each machine having a cloth-clamping plate, a carriage intermediate the stitching-machines, a platform on the carriage, plates adjustably mounted on the platform, gages, devices for coacting with the gages for temporarily holding a collar to be operated upon, means for operating the cloth-clamping plates to hold the collar presented by the gages, a centralizing device, and means releasing the centralizing device from the collar, said means also serving to withdraw the carriage from the buttonhole-stitching machines and disengaging the temporary holding devices from the collar.

30. In combination, a pair of adjustably-mounted buttonhole-stitching machines, scales adjacent thereto, a carriage adjustably mounted and provided with a scale to indicate movement of the carriage to or from the buttonhole-stitching machines, a platform, gaging devices mounted on the platform, scales indicating the adjustment of the gaging devices to or from the carriage, scales indicating the movement of the gaging devices to or from the stitching-machines, an adjustable centralizing device, scales indicating the adjustment of the centralizing device to or from the stitching-machines, means operating the centralizing device and carriage.

31. In combination, a pair of buttonhole-stitching machines provided with cloth-clamping plates, a slidably-mounted platform, gaging devices adjustably mounted on the platform, means coacting with the gages for temporarily holding a collar when it is gaged, means for sliding the platform toward the stitching-machines, mechanism for operating the cloth-clamping plates simultaneously, means withdrawing the platform from the buttonhole-machines, and releasing the temporary holding devices.

32. In combination, a pair of buttonhole-stitching machines, a slidably-mounted platform mounted to move toward or from the two buttonhole-machines, and gages carried by the platform.

33. In combination, a pair of buttonhole-stitching machines, a slidably-mounted platform, plates mounted on the platform, means for adjusting the plates toward or from the buttonhole-machines, and gages mounted on the plates, the ends of the plates toward the buttonhole-machines extending beyond the gages.

34. In combination, a frame, a buttonhole-machine, a slidably-mounted platform mounted to move toward or from the buttonhole-machine, means carried by the platform for holding an article to receive a buttonhole, and means adjacent the buttonhole-machine for holding the article delivered thereto by the platform.

35. In combination, a frame, a buttonhole-machine, a slidably-mounted platform mounted to move toward or from the buttonhole-machine, means carried by the platform to temporarily hold an article to receive a buttonhole, gages adjacent the latter means, and means adjacent the buttonhole-machine for receiving the article from the temporary holding means.

36. In combination, a pair of buttonhole-machines, a slidably-mounted platform mounted to move toward or from the buttonhole-machines, means carried by the platform for holding an article to receive a buttonhole, a centralizing device, and means adjacent the buttonhole-machines for holding the article delivered thereto by the platform.

37. In combination, a pair of buttonhole-machines, a slidably-mounted platform and centralizing device, means adjacent the buttonhole-machines for holding a collar delivered thereto by the platform, and means for operating the platform and centralizing device.

38. In combination, a pair of buttonhole-machines, a slidably-mounted platform and centralizing device, means on the platform for gaging a collar, means adjacent the buttonhole-machines for holding the collar delivered thereto by the platform, and means for operating the centralizing device and platform.

39. In combination, a pair of buttonhole-machines, a slidably-mounted centralizing mechanism, consisting of a platform, gages, and means for temporarily holding the gaged collar, means adjacent the sewing-machines for holding the collar delivered thereto by the platform, and means for operating the centralizing mechanism for introducing the collar to the sewing-machines, the temporary holding means being released from the collar by the withdrawal of the centralizing mechanism.

40. In combination, a frame, a buttonhole-machine, a slidably-mounted platform mounted to move toward or from the buttonhole-machine, and means for gaging an article which is to be operated upon by the buttonhole-machine, the platform supporting and carrying said article.

41. In combination, a frame, buttonhole-stitching mechanism, a slidably-mounted centralizing mechanism consisting of a slidable platform carrying gaging means and means engaging the article to be operated upon, and means for operating the centralizing mechanism.

42. In combination, a buttonhole-machine having a work-support, gages, a movable platform adapted to receive an article to be operated upon, and adapted to be moved to deliver and position said article on the work-support, and means for holding the article after it is in position.

43. In combination, a frame, a buttonhole-machine having a needle, a platform to receive and deliver an article to the sewing-machine, the inner end of the platform extending under the needle of the machine when delivering the article, means for gaging the article to be operated upon, and means holding the article after it is delivered.

44. In combination, a frame, a pair of buttonhole-machines having needles, a platform mounted to be moved toward the pair of buttonhole-machines to introduce an article thereto, the inner edge of the platform extending under the needles when the article is introduced to the machines, and means holding the article after it is delivered.

45. In combination, a buttonhole-machine, having a work-support, gages, a movable platform adapted to receive an article to be operated upon, and adapted to be moved to deliver and deposit said article on the work-support, and means for holding the article after it is gaged and deposited.

HENRY C. MILLER.

Witnesses:
 CHARLES SELKIRK,
 ALEX. SELKIRK.